United States Patent
Hiramatsu

(10) Patent No.: US 7,013,135 B2
(45) Date of Patent: Mar. 14, 2006

(54) CELL SEARCHER AND CELL SEARCHING METHOD

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 375 days.

(21) Appl. No.: 10/381,697

(22) PCT Filed: Jul. 25, 2002

(86) PCT No.: PCT/JP02/07531

§ 371 (c)(1),
(2), (4) Date: Mar. 27, 2003

(87) PCT Pub. No.: WO03/015303

PCT Pub. Date: Feb. 20, 2003

(65) Prior Publication Data

US 2004/0043746 A1    Mar. 4, 2004

(30) Foreign Application Priority Data

Aug. 7, 2001    (JP) .............................. 2001-239177

(51) Int. Cl.
H04B 1/707    (2006.01)
(52) U.S. Cl. .................... 455/423; 455/456.1; 455/436
(58) Field of Classification Search ............... 455/423, 455/422.1, 456, 502, 436–443, 500, 501, 455/456.1

See application file for complete search history.

(56) References Cited

U.S. PATENT DOCUMENTS 6,219,345 B1 *    4/2001    Clark et al. .................. 370/337

(Continued)

FOREIGN PATENT DOCUMENTS

EP    1117188 A    7/2001

(Continued)

OTHER PUBLICATIONS

"3GPP TS 25.221 v3.7.0(Jun. 2001)", 3rd Generation Partnership Project; Technical Specification Group Radio Access Network; Physical channels and mapping of transport channels onto physical channels (TDD), Technical Specification, Release 1999.

(Continued)

Primary Examiner—William J. Deane, Jr.
(74) Attorney, Agent, or Firm—Stevens, Davis, Miller & Mosher, LLP

(57) ABSTRACT

Peak detector 104 detects the first peak timing where the correlation value of the first synchronization channel is the greatest. SSCH identifier 108 identifies the second synchronization channels by adding the correlation values of the second synchronization channels at a number of timings, and detects the timing where the sum of the correlation values of the identified second synchronization channels is the largest as a second peak timing. Based on the first and second peak timings, timing controller 105 instructs SSCH identifier 108 on the timing to perform correlation calculation. Likewise, based on the first and second peak timings, frequency corrector 110 calculates the error in a frame time measured by a base station, and converts this into a frequency difference, and changes the frequency of an oscillator in RF receiver 102 in such a way that corrects the frequency difference. By this means second synchronization channels and mid-ambles are accurately identified even when a base station gives a different measurement of a frame time.

9 Claims, 3 Drawing Sheets

U.S. PATENT DOCUMENTS

| | | | |
|---|---|---|---|
| 6,356,763 B1 * | 3/2002 | Kangas et al. | 455/456.1 |
| 6,888,880 B1 * | 5/2005 | Lee et al. | 375/149 |
| 2002/0061054 A1 * | 5/2002 | Booorian | |

FOREIGN PATENT DOCUMENTS

| | | |
|---|---|---|
| JP | 11088291 | 3/1999 |
| JP | 11266181 | 9/1999 |
| JP | 2000174662 | 6/2000 |
| JP | 2001168770 | 6/2001 |

OTHER PUBLICATIONS

"3GPP TS 25.224 V3.7.0(Jun. 2001)". 3rd Generation Partnership Project; Technical Specification Group Radio Access Network; Physical Layer Procedures (TDD), Technical Specification, Release 1999.

* cited by examiner

CELL SEARCHER AND CELL SEARCHING METHOD

TECHNICAL FIELD

The present invention relates to apparatus and methods for cell search, used in mobile communication systems of W-CDMA/TDD schemes.

BACKGROUND ART

In a mobile communication system, a communication terminal apparatus, when the power is turned on, searches for a cell to which it belongs (i.e. initial cell search), and searches for the cells as it moves across the cells (i.e. idle period cell search). Below, a cell search method in a mobile communication system of a W-CDMA/TDD scheme will be explained.

Every cell in a mobile communication system is assigned a scrambling code and a code group that corresponds to the scrambling code. As for the code group, there are four combinations of mid-ambles and scramble codes assigned such that they are not erroneously identified between neighboring cells.

Moreover, as shown in the control signal frame configuration diagram of FIG. 1, using predetermined slots in a frame (#0 and #8 in FIG. 1), by the timing $t_{offset}$ which is offset from the top of a slot by a predetermined time, a base station apparatus transmits the first synchronization channel (Primary Synchronization Code Channel: Cp) that is common to all cells, and the second synchronization channels (Secondary Synchronization Code Channel: Cs) that carry three codes to express a code group, simultaneously. As for the second synchronization channels, selecting 3 types from 17 types gives $4913=17^3$ combinations, and out of these, the 32 least error detection types are used to express a code group.

Moreover, a second synchronization channel, Csj (j=1, 2, 3), is subjected to modulation that is 90°×n (n=0, 1, 2, 3) to the phase of the first synchronization channel Cp upon transmission. $b_j$ in FIG. 1 denotes the phase rotation amount in each second synchronization channel in relative to the phase of the first synchronization channel Cp.

As for the cells, these can be selected from Case 1, where synchronization channels are transmitted using one portion (the kth slot) of a frame (10 ms), and from Case 2, where synchronization channels are transmitted using two portions (the kth slot and the k+8th slot) of a frame (k is a whole number from 0 to 7).

When performing an initial cell search, for the first step, a communication terminal apparatus performs the correlation calculation of the first synchronization channel, and detects the timing giving the largest correlation value (hereinafter "peak timing") as a slot timing.

Next, for the second step, the communication terminal apparatus performs the correlation calculation of 17 types of second synchronization channels and identifies the three types of second synchronization channels being transmitted from a base station apparatus. When identifying these second synchronization channels, the communication terminal apparatus uses 4-frame signals for Case 1, and 2-frame signal for Case 2. Then, the communication terminal apparatus identifies the code group assigned to its cell based on the phase rotation amount in four frames of the identified three types of second synchronization channels and the time offset value $t_{offset}$ of the synchronization channels from the top of a slot, and thus detects the timing of a frame top.

Finally, for the third step, the communication terminal apparatus performs the correlation calculation of the four types of mid-ambles belonging to the identified code group, and identifies the mid-amble and scrambling code assigned to its cell. Incidentally, to improve the characteristics of this mid-amble detection, the communication terminal apparatus performs wireless communication while synchronizing with the base station through AFC (Automatic Frequency Control).

In a mobile communication system of a W-CDMA/TDD scheme, thus, a communication terminal apparatus performs an initial cell search (scrambling code identification) in three steps.

Now, in the above cell search, a communication terminal apparatus is not frequency-synchronized with a base station, and so the oscillators in these apparatus have different oscillation frequencies, thus measuring one frame time differently.

However, since a conventional cell search method does not take the difference between frame times measured by a communication terminal and a base station apparatus into consideration, in the second step, correlation calculation is performed at a wrong timing that is off the peak timing.

For instance, if the one-frame time measured by a base station serves as a standard, and, in comparison thereto, the one-frame time measured by a communication terminal is shorter than that by the above base station by $\alpha$[s], the communication terminal apparatus, in the second step, develops the difference from the peak timing by $\alpha$[s] for every frame. If second synchronization channels are identified over four frames, a difference of maximum $4\alpha$[s] can result. In case this error develops large (greater than ½ chip time, for instance), the communication terminal apparatus becomes incapable of peak detection and detecting second synchronization channels.

Moreover, if the difference between the oscillation frequencies of the oscillators in a communication terminal apparatus and a base station apparatus grows large, the accuracy of synchronization detection in the early stages of AFC in the third step decreases, thereby making accurate mid-amble detection difficult.

DISCLOSURE OF INVENTION

One of the primary objects of the present invention is to provide apparatus and methods for cell search for use in mobile communication systems of W-CDMA/TDD schemes that enable accurate identification of second synchronization channels and mid-ambles even where a base station gives a different measurement of a frame time.

The above object can be achieved by, in the second step of a W-CDMA/TDD scheme-based cell search, comparing the correlation calculation results of several timings and selecting the second synchronization channels from the timings that correspond to the largest correlation calculation results.

BEST MODE FOR CARRYING OUT THE INVENTION

An embodiment of the present invention will be described below with reference to the accompanying drawings.

Figure 1:
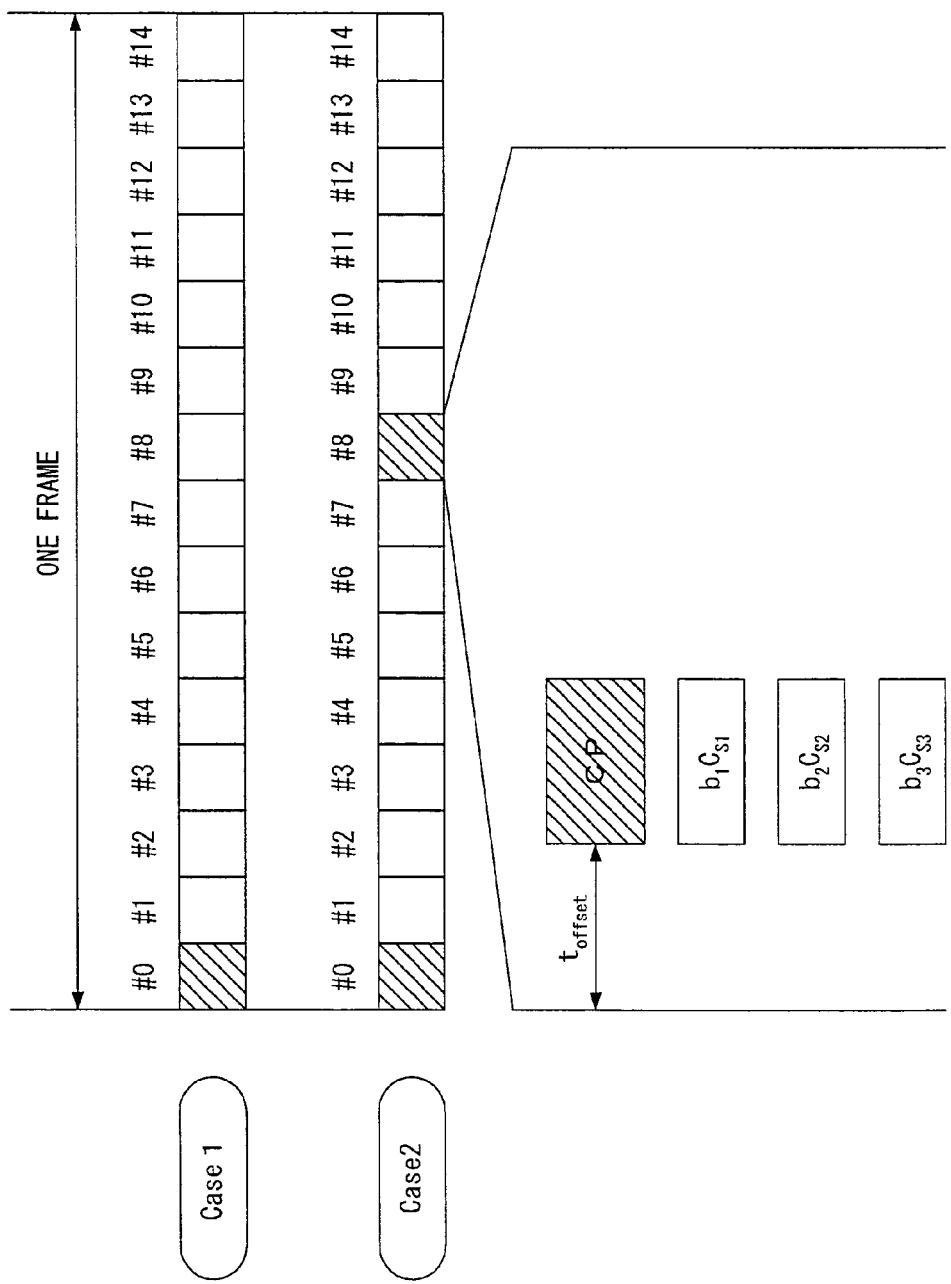
FIG. 1 is a frame configuration diagram of control signal at base station apparatus.
Figure 2:
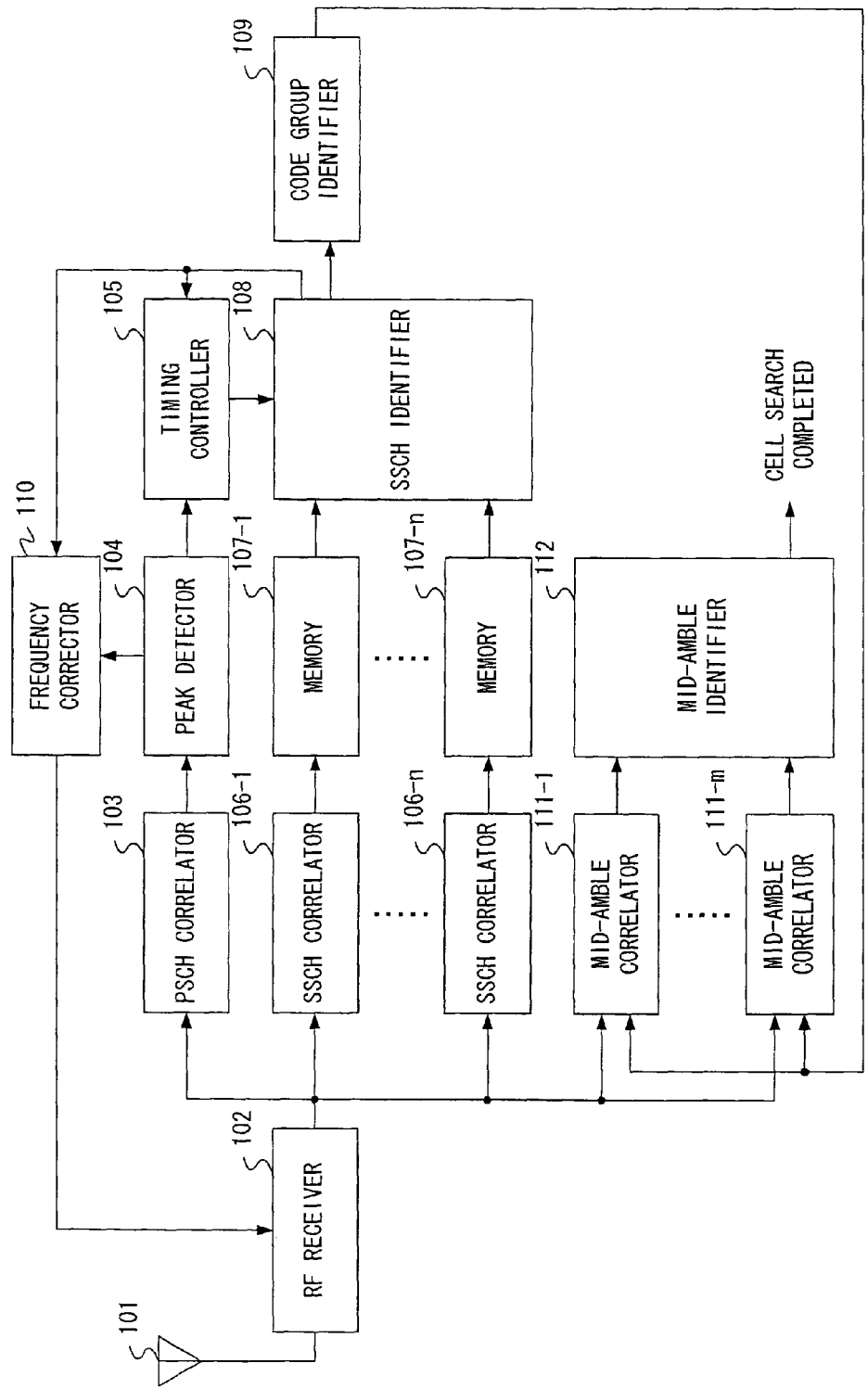
FIG. 2 is a block diagram showing a configuration of a cell search apparatus according to the embodiment of the present invention.

FIG. 2 is a block diagram showing a configuration of a cell search apparatus according to the embodiment of the invention. The following explanation concerns Case 1, where a frame (10 ms) transmits synchronization channels using one portion (kth frame) thereof.

Antenna 101 receives a career frequency signal transmitted from a base station. RF receiver 102 subjects the signal received by antenna 101 to various processings including down-conversion, amplification, and A/D conversion, so as to obtain a baseband digital signal.

PSCH correlator 103 calculates the correlation between the output signal from RF receiver 102 and the first synchronization channel. Peak detector 104 detects the timing where the correlation with the first synchronization channel becomes maximum (hereinafter "first peak timing") and outputs the detection result to timing controller 105 and to frequency corrector 110.

The above processings in PSCH correlator 103 through peak detector 104 are the first step of a cell search.

Based on the first peak timing detected in peak detector 104 and based on the second peak timing detected in SSCH identifier 108, which will be described later, timing controller 105 controls the timing to take correlation values out of memories 107-107-$n$. Each of SSCH correlators 106-1~106-$n$ is assigned one of the second synchronization channels, and calculate the correlation between the assigned second synchronization channel and the output signal from RF receiver 102 on a per (¼) Ts basis. "Ts" denotes the time of one chip. Memories 107-1~107-$n$ store four frames of the correlation values output from corresponding SSCH correlators 106-1~106-$n$.

SSCH identifier 108 takes the correlation values out of memories 107-1~107-$n$ by the timing instructed by timing controller 105, identifies three second synchronization channels of the same timing, that correspond to the three largest correlation values, and outputs these to code group identifier 109. Moreover, as a second peak timing, SSCH identifier 108 outputs the timing where the sum value of the identified second synchronization channels become the largest to timing controller 105 and to frequency corrector 110. Code group identifier 109 identifies the code group assigned to its cell based on the phase rotation amount in four frames of the three second synchronization channels identified in SSCH identifier 108 relative to the first synchronization channel, and thus detects the timing of a frame top.

The above processings in timing controller 105 through group identifier 109 are the second step of a cell search. The above second step in the cell search apparatus according to the present embodiment will be described in more details later.

Based on the first peak timing and the second peak timing, frequency corrector 110 calculates the difference relative to the frame time measured in the base station, and converts this calculated difference into a frequency difference. Then, frequency corrector 110 corrects the frequency of the oscillator in RF receiver 102 in such a way that corrects the frequency difference. Incidentally, detailed examples of calculation in frequency corrector 110 will be described later.

Mid-amble correlators 111-1~111-$m$ calculate the correlation between the mid-amble belonging to the identified code group and the output signal from RF receiver 102, and outputs the correlation value to mid-amble identifier 112.

Mid-amble identifier 112 identifies the mid-amble from those corresponding to the largest correlation values output from mid-amble correlators 111-1~111-$n$. Moreover, the mid-ambles and scramble codes are in one-to-one pairs, and in accordance therewith identifier 112 identifies the cell's scrambling code.

The processings in frequency corrector 110 through mid-amble identifier 112 are the third step of a cell search. The cell search apparatus of FIG. 2 completes an initial cell search by implementing the above first through three steps (i.e. scrambling code identification).

Figure 3:
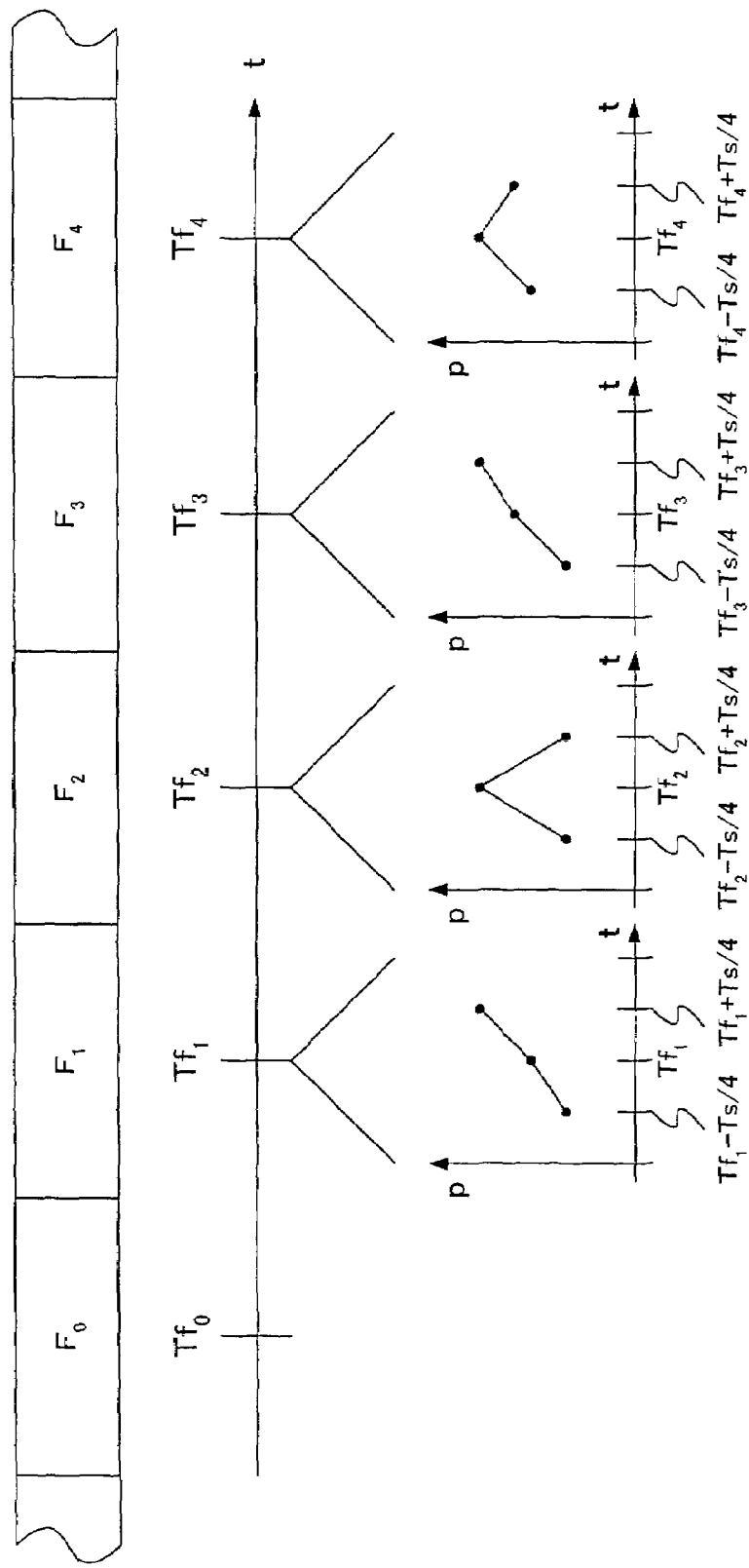
FIG. 3 shows in detail the second step in a cell search apparatus according to the embodiment of the invention.

Next, the second step in the cell search apparatus of the present embodiment will be described in detail with reference to FIG. 3. In FIG. 3, frame $F_0$ denotes the frame where the first peak timing $T_{f0}$ is detected, and frame $F_i$ is the ith frame from frame $F_0$.

The window width in timing controller 105 is set in advance to a certain width (Ts/2 in FIG. 3). Then, timing controller 105 instructs memories 107-1~107-$n$ on the timing $Tf_1$ which is one frame time after the first peak timing $Tf_0$, and the timings ($Tf_1$−Ts/4) and ($Tf_1$+Ts/4) that corresponds to the front and rear ends of the window centering around the timing $Tf_1$.

Memories 107-1~107-$n$ output the correlation values at the timings $Tf_1$, ($Tf_1$−Ts/4), and ($Tf_1$+Ts/4) to SSCH identifier 108.

With frame F1, with reference to the correlation values output from memories 107-1~107-$n$ at $Tf_1$, SSCH identifier 108 identifies the three largest second synchronization channels. Moreover, at the timings $Tf_1$, ($Tf_1$−Ts/4), and ($Tf_1$+Ts/4), SSCH identifier 108 adds the correlation values of the three identified second synchronization channels, detects the timing giving the largest sum as a second peak timing, and outputs the second peak timing to timing controller 105 and to frequency corrector 110. In the case of FIG. 3, the sum is maximum at the timing of ($Tf_1$+Ts/4), and so SSCH identifier 108 sets a second peak timing on the timing ($Tf_1$+Ts/4). Incidentally, since the addition of the correlation values can reduce the impact of noise, and accordingly, detecting a maximum timing by adding correlation values and using the result thereof is more accurate than performing such detection using one correlation value.

That the sum of the correlation values is maximum at the timing ($Tf_1$+Ts/4) denotes that the frame time measured in the cell search apparatus is shorter than that by the base station.

For instance, if a frame time measured in a cell search apparatus is shorter than that by a base station by $\alpha$[s], in case of a typical cell search apparatus, the timing difference in correlation calculation becomes $2\alpha$[s] in frame $F_2$. In contrast, if a cell search apparatus according to the present invention is used, the timing difference upon correlation calculation in frame $F_2$ becomes ($2\alpha$−Ts/4) [s], and the difference is thus reduced compared to the above typical cell search apparatus.

Timing controller 105 instructs memories 107-1~107-$n$ on the timing $T_{f2}$, and the timings ($T_{f2}$−Ts/4) and ($T_{f2}$+Ts/4) corresponding to the front and rear ends of the window centering around the timing $T_{f2}$.

Memories 107-1~107-$n$ output the correlation values at $T_{f2}$, ($T_{f2}$−Ts/4), and ($T_{f2}$+Ts/4) to SSCH identifier 108.

With frame F2, with reference to the correlation values output from memories 107-1~107-$n$ at the timing of $Tf_2$, SSCH identifier 108 identifies the three largest second synchronization channels. Moreover, at the timings $Tf_2$, ($Tf_2$−Ts/4), and ($Tf_2$+Ts/4), SSCH identifier 108 adds the correlation values of the three identified second synchronization channels, and outputs the timing giving the largest sum as another second timing to timing controller 105 and frequency corrector 110. In the case of FIG. 3, the sum is maximum at the timing of $Tf_2$, and so SSCH identifier 108 sets another second peak timing on the timing $Tf_2$. Thereafter, with frames $F_3$ and $F_4$, the cell search apparatus identifies the second synchronization channels in the same manner as in the processings for frame $F_2$.

Comparison of the correlation values at several timings including the standard timing and the setting of a new standard timing upon the timing that gives the largest correlation value thus makes it possible to save timing differences upon correlation calculation within a given range, so that peak detection and second synchronization channel identification in the second step can be performed with certainty.

Incidentally, in the above explanation, the window width is set centering around a standard timing that is one frame time behind the first or the second peak timing, and, with respect to the three timings including the standard timing and the timings corresponding to the front and rear ends of the window, the sums of the correlation values are compared. However, the present invention is by no means limited to the above and the comparison of the sums of correlation values can be performed with respect to a number of timings within a predetermined time range centering around a standard timing.

Next, the method of calculation in frequency corrector 110 will be described in detail assuming the case of FIG. 3.

In FIG. 3, the second peak timings in the frames are respectively $(Tf_1+Ts/4)$, $Tf_2$, $(Tf_3+Ts/4)$, and $Tf_4$, indicating that error of $Ts/2$ has occurred over four frames. Where one frame is 10 ms and Ts is $(1/3.84) \times 10^{-6}$ ms, this gives error of $(1/(4 \times 2 \times 3.84)) \times 10^{-6}$ ms per frame. If this is converted into frequency difference, using ppm $(10^{-6})$ for the frequency difference unit, the result will be $(1/(4 \times 2 \times 3.84))$ ppm. Such calculation is performed in frequency corrector 110, and the frequency of the oscillator in RF receiver 102 is corrected in such a way that corrects the frequency difference. Incidentally, given that voltage control oscillators are in common use, frequency corrector 110 supplies voltage that is equivalent of the frequency difference to the oscillator.

By correcting the frequency difference obtained thus and setting the initial level of AFC, the accuracy of detection in the early stages of AFC can be improved, so as to enable accurate mid-amble detection.

Furthermore, referring to the third step, receiving second synchronization channels that are not used for AFC alone increases power consumption. In contrast, the present embodiment solves the above problem as second synchronization channels become unnecessary during AFC in the third step.

As obvious from the above description, according to the present invention, the differences between the timings of correlation calculation can be constantly saved within a given range, so that second synchronization channels and mid-ambles can be accurately identified.

The present application is based on Japanese Patent Application No. 2001-239177 filed on Aug. 7, 2001, the entire content of which is expressly incorporated herein by reference.

INDUSTRIAL APPLICABILITY

The present invention is suitable for use with wireless communication terminal apparatus in mobile communication systems of W-CDMA/TDD schemes.

The invention claimed is:

1. A cell search method of a wireless communication terminal apparatus, said method comprising:
   (a) performing a correlation calculation of a first synchronization channel whereupon a first peak timing that gives a largest correlation value is detected as a slot timing;
   (b) performing correlation calculations of all second synchronization channels so as to identify a code group assigned to a cell where the apparatus is located, and detect a timing of a frame top; and
   (c) performing a correlation calculation of a mid-amble belonging to the identified code group, so as to identify the mid-amble and a scrambling code assigned to the cell where the apparatus is located;
   wherein step (b) comprises:
   identifying a second synchronization channel at an initial standard timing that is one frame time after the first peak timing;
   detecting the timing where the correlation value of the identified second synchronization channel is the largest among a plurality of timings within a predetermined time range centering around the standard timing; and
   setting a second and later standard timing at the timing that is one frame time after a most currently detected second peak timing, and repeating the second synchronization channel identification and second peak timing detection by new standard timings.

2. The cell search method according to claim 1, wherein step (c) performed after steps (a) and (b) comprises:
   calculating a difference of a frame time measured by the apparatus implementing the cell search method relative to the frame time measured by a base station apparatus of a communication partner based on the first and second peak timings, and converting the difference to a frequency difference;
   changing an oscillator frequency in such a way that corrects said frequency; and
   identifying the mid-amble and the scrambling code assigned to the cell the apparatus is in.

3. A cell search apparatus comprising:
   a first correlator that performs a correlation calculation of a first synchronization channel;
   a peak detector that detects a first peak timing where the first correlator gives a largest correlation calculation result;
   a second correlator that performs said correlation calculation of all second synchronization channels;
   a timing controller that sets an initial standard timing one frame time after the first peak timing and sets a plurality of timings within a predetermined time range around said initial standard timing; and
   a second synchronization channel identifier that compares correlation calculation results in the second correlator at the initial standard timing and identifies the second synchronization channels, and detects a second peak timing among said plurality of timings set by the timing controller where the identified second synchronization channels give a largest correlation value,
   wherein the timing controller sets a second and later standard timing one frame time after a most currently detected second peak timing.

4. The cell search apparatus according to claim 3, wherein the timing controller sets a standard timing, a timing a predetermined time before said standard timing, and a timing a predetermined time after said standard timing.

5. The cell search apparatus according to claim 3, wherein the second synchronization channel identifier identifies a plurality of second synchronization channels, adds correlation values of said plurality of second synchronization channels at each timing set by the timing controller, and detects the second peak timing at a timing that gives a largest sum of said correlation values.

6. The cell search apparatus according to claim 3, further comprising a frequency corrector that, with reference to the first and second peak timings, calculates a difference of a frame time measured by said cell search apparatus relative to the frame time measured by a base station apparatus of a communication partner, converts said difference to a frequency difference, and changes an oscillator frequency to correct said frequency difference.

7. A wireless communication terminal apparatus comprising a cell search apparatus, said cell search apparatus comprising:
  a first correlator that performs a correlation calculation of a first synchronization channel;
  a peak detector that detects a first peak timing where the first correlator gives a largest correlation calculation result;
  a second correlator that performs said correlation calculation of all second synchronization channels;
  a timing controller that sets an initial standard timing one frame time after the first peak timing and sets a plurality of timings within a predetermined time range around said initial standard timing; and
  a second synchronization channel identifier that compares correlation calculation results in the second correlator at the initial standard timing and identifies the second synchronization channels, and detects a second peak timing among said plurality of timings set by the timing controller where the identified second synchronization channels give a largest correlation value,
  wherein the timing controller sets a second and later standard timing one frame time after a most currently detected second peak timing.

8. A cell search method comprising:
  (a) performing a correlation calculation of a first synchronization channel whereupon a first peak timing that gives a largest correlation value is detected as a slot timing;
  (b) performing correlation calculations of all second synchronization channels so as to identify a code group assigned to a cell where the apparatus is in, and detect a timing of a frame top; and
  (c) performing correlation calculation of a mid-able belonging to the identified code group, so as to identify the mid-amble and a scrambling code assigned to the cell where the apparatus is located;
  wherein the step (b) comprises:
  identifying a second synchronization channel at an initial standard timing that is one frame time after the first peak timing;
  detecting the timing where the correlation value of the identified second synchronization channel is the largest among a plurality of timings within a predetermined timing centering around the standard timing; and
  setting a second and later standard timing at the timing that is one frame time after a most currently detected second peak timing, and repeating the second synchronization channel identification and second peak timing detection by new standard timings.

9. The cell search method according to claim 1, wherein step (c) performed after steps (a) and (b) comprises:
  calculating a difference of a frame time measured by the apparatus implementing the cell search method relative to the frame time measured by a base station apparatus of a communication partner based on the first and second peak timings, and converting the difference to a frequency difference;
  changing an oscillator frequency in such a way that corrects said frequency difference; and
  identifying the mid-amble and the scrambling code assigned to the cell in which the apparatus is located.

* * * * *